United States Patent [19]

Varshney et al.

[11] Patent Number: 5,723,559
[45] Date of Patent: *Mar. 3, 1998

[54] INITIATING PROCESS AND SYSTEM FOR THE ANIONIC POLYMERISATION OF ACRYLIC MONOMERS

[75] Inventors: Sunil K. Varshney, Liege; Roger Fayt, Neupre; Philippe Teyssie, Neuville en Condroz, all of Belgium

[73] Assignee: Elf Atochem S.A., France

[*] Notice: The term of this patent shall not extend beyond the expiration date of Pat. No. 5,629,393.

[21] Appl. No.: 479,970

[22] Filed: Jun. 7, 1995

Related U.S. Application Data

[62] Division of Ser. No. 91,403, Jul. 14, 1993, Pat. No. 5,629,393, which is a continuation of Ser. No. 776,231, Nov. 12, 1991, abandoned.

[30] Foreign Application Priority Data

Jun. 5, 1989 [FR] France .................... 89 07374
May 22, 1990 [FR] France .................... 90 06351

[51] Int. Cl.$^6$ .................... C08F 120/18; C08F 4/56
[52] U.S. Cl. .................... 526/329.7; 526/175
[58] Field of Search .................... 526/329.7, 175

[56] References Cited

U.S. PATENT DOCUMENTS 3,285,894  11/1966  Lim et al. .................... 526/175

FOREIGN PATENT DOCUMENTS 1 003 543  9/1965  United Kingdom .
1 477 373  6/1977  United Kingdom .

OTHER PUBLICATIONS

Wiles, D.M. et al., "The Butyllithium–Initiated Polymerization of Methyl–methyacrylate. III. Effects of Lithium Alkoxides," Journal of Physical Chemistry, vol. 68, No. 7, Jul. 1964, pp. 1983–1987.

*Primary Examiner*—Joseph L. Schofer
*Assistant Examiner*—Wu C. Cheng
*Attorney, Agent, or Firm*—Finnegan, Henderson, Farabow, Garrett & Dunner, L.L.P.

[57] ABSTRACT

This invention relates to an initiating system for the anionic polymerization of acrylic monomers, and where necessary vinyl comonomers, including at least one R-M initiator in which M is a metal chosen from among the alkali and alkaline earth metals and R is a linear or branched chain alkyl, aryl, or arylalkyl radical. The polymerization may also take place in the presence of at least one $R_1OM_1$ alkali metal alcoholate, in which R is an linear or branched chain alkyl, aryl, or arylalkyl radical and $M_1$ is an alkali metal, on the condition that when $M_1$ is lithium, then R is an aryl or arylalkyl radical. This invention also related to a process for the polymerization of primary, secondary, or tertiary alkyl acrylates, and possibly of vinyl comonomers, in the presence of the initiating system described above.

5 Claims, No Drawings

INITIATING PROCESS AND SYSTEM FOR THE ANIONIC POLYMERISATION OF ACRYLIC MONOMERS

This is a division of application Ser. No. 08/091,403, filed Jul. 14, 1993, U.S. Pat. No. 5,629,393, which is a continuation of application Ser. No. 07/776,231 filed Nov. 12, 1991, now abandoned.

The present invention relates to a process and to an initiating system for the anionic polymerisation of acrylic monomers and, if appropriate, of vinyl comonomers. More particularly, it relates to the polymerisation of primary alkyl acrylates and the preparation of diblock copolymers combining a primary alkyl acrylate block with a block of methacrylic monomer, of secondary or tertiary alkyl acrylate or of vinyl monomer.

The anionic polymerisation of methyl methacrylate in the presence of a mixture of butyllithium and lithium alcoholates is known from the Journal of Physical Chemistry 68(7), pages 1983–87. Unfortunately, this system of initiators exhibits unfavourable kinetics, the yield not exceeding 30% after 21 minutes and 65% after 70 minutes. Furthermore, British Patent No. 1,003,549 describes a process for anionic polymerisation of ethylenically unsaturated monomers employing tertiary alcoholates of alkali metals as catalysts. These alcoholates can be employed in combination with organometallic compounds, in particular alkyllithiums, with which they form complexes. By virtue of such catalysts the polymerisation of methyl methacrylate runs uniformly in a temperature range from −40° to +20° C., after a short induction period whose length is inversely proportional to the quantity of catalyst which is added. Up to +10° C. an isotactic polymethyl methacrylate (PMMA) is formed (as confirmed by infrared analysis and by nuclear magnetic resonance), whereas above 10° C. an insoluble three-dimensional polymer is produced. The polymerisation of butyl acrylate at 0° C. in the presence of potassium tert-butanolate produces a viscous prepolymer syrup.

Lastly, Patent FR-A-2,252,360 describes a mixture of ethyl ester of alpha-lithioisobutyric acid and of an alkali metal alcoholate which reaches only a 41% yield in the polymerisation of n-butyl acrylate.

Furthermore, Example 17 of European Patent Application No. 068,887 describes the sequential addition of ethyl acrylate and then of methyl methacrylate, in equivalent quantities, to tetrahydrofuran in the presence of a catalyst consisting of tetrabutylammonium fluoride and [(1-methoxy-2-methyl-1-propenyl)oxy]trimethylsilane. The exothermic polymerisation takes place at a temperature which is not lower than 25° C. and results in a viscous liquid copolymer, of number-average molecular weight of 600, with a polydispersity index of 2.0 and consisting of 45 mol % of methacrylate units and 55 mol % of acrylate units.

The problem, so far unsolved, with which the present invention is concerned consists, therefore, in defining an initiating system and a process permitting, with satisfactory yields, the direct anionic polymerisation of primary alkyl acrylates and, with kinetics which are more favourable than those of the known systems based on an alkali metal alcoholate, the anionic polymerisation of other acrylic, methacrylic or vinyl monomers, so as to permit the preparation of solid diblock copolymers of high molecular weight, combining a primary alkyl acrylate block with a block of such a comonomer.

The present invention is based on the finding that it is possible to reach high yields in the anionic polymerisation of (meth)acrylates by carrying out the said polymerisation in the presence of carefully selected pairs of an initiator of formula R-M in which M denotes an alkali metal and R an alkyl, aryl or alkylaryl radical and of at least one alkali metal alcoholate. In fact, the polymerisation yield of a monomer such as methyl methacrylate or n-butyl acrylate generally reaches at least 70% in the presence of such an initiating pair.

Thus, a first subject of the present invention consists of an initiating system for the anionic polymerisation of (meth)acrylates and, if appropriate, of vinyl comonomers, comprising at least one initiator of formula R-M(I) in which M denotes a metal chosen from alkali and alkaline-earth metals and R denotes a straight- or branched-chain alkyl radical containing from 2 to 6 carbon atoms or an aryl radical or an arylalkyl radical, characterised in that it additionally comprises at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical. In the polymerisation initiating system according to the invention, $M_1$ is preferably chosen from sodium, potassium, rubidium and caesium. When $M_1$ is lithium, the initiator of formula (I) may be chosen especially from the compounds of formula:

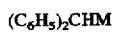

$(C_6H_5)_2CHM$ in which M is chosen from lithium, sodium and potassium, and from 1,1-diphenyl-3-methylpentyllithium, 1,1-diphenylhexyllithium and alpha-methylstyryllithium. When $M_1$ is not lithium, then compounds such as n-butyllithium, 1,4-disodio-1,1,4,4-tetraphenylbutane, n-butylsodium or sec-butyllithium can be added to this list. The molar ratio of the alkali metal alcoholate to the initiator in the initiating system according to the invention may vary within very wide limits. However, the obtaining of specific results in the polymerisation of (meth)acrylates is generally determined by the choice of a molar ratio of between approximately 0.3 and approximately 25, although larger quantities of alcoholate cannot be detrimental. In order to solve the problems addressed by the present invention, the quantity of alcoholate must be sufficient to permit the formation of a complex with the polymerisation active centre and, thereby, to stabilise the latter.

A second subject of the present invention consists of a process for the polymerisation of (meth)acrylates and optionally of vinyl comonomers with the aid of at least one initiator of formula R-M(I) in which M denotes a metal chosen from alkali and alkaline-earth metals and R denotes a straight- or branched-chain alkyl radical containing 2 to 6 carbon atoms or an aryl radical or an arylalkyl radical, characterised in that the polymerisation is carried out in the additional presence of at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical.

The initiator of formula (I) and the alkali metal alcoholate form together a polymerisation initiating system in accordance with the first subject of the present invention and in the case of which reference will be made to the detailed description above.

Initiators of formula R-M(I) which can be employed in the process according to the invention are especially diphenylmethylsodium, diphenylmethylpotassium and 1,4- disodio-1,1,4,4-tetraphenylbutane, alpha-methylstyryllithium and diphenylmethyllithium.

The process according to the invention is particularly advantageous for obtaining polymers containing a primary alkyl acrylate block, the said acrylate being chosen especially from those in which the alkyl group, substituted, if appropriate, by at least one halogen atom such as chlorine or fluorine, contains from 1 to 8 carbon atoms, more particularly methyl acrylate, ethyl acrylate, n-propyl acrylate, n-butyl acrylate, n-hexyl acrylate, 2,2,2-trifluoroethyl acrylate or 2-ethylhexyl acrylate. In this case, it permits the preparation of blocks which have a number-average molecular weight of approximately between 2,000 and 200,000 and a molecular mass dispersity index (defined as the ratio of the weight-average molecular mass to the number-average molecular mass) which is generally approximately between 1.2 and 3.5, as determined by exclusion chromatography.

The process according to the invention can also be employed for the polymerisation of secondary or tertiary alkyl acrylates such as the isopropyl, sec-butyl or tert-butyl compounds, of methacrylic monomers and, also, of nonacrylic vinyl comonomers. Nonacrylic vinyl comonomers which may be mentioned are especially butadiene, isoprene, 2-vinylpyridine, 4-vinylpyridine and vinylaromatic monomers.

A methacrylic monomer within the meaning of the present invention means a monomer chosen from alkyl methacrylates in which the alkyl radical, substituted if appropriate, for example by at least one halogen atom such as chlorine or fluorine, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl and decyl methacrylates, as well as glycidyl methacrylate, norbornyl methacrylate, methacrylonitrile and dialkylmethacrylamides.

A vinylaromatic monomer within the meaning of the present invention means an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

In particular, the process according to the invention permits the preparation of a diblock copolymer of structure A-B in which A denotes a block of methacrylic monomer, of secondary or tertiary alkyl acrylate or of vinylaromatic monomer, and B denotes a primary alkyl acrylate block, the number-average molecular weight of the block A being approximately between 2,000 and 300,000, the number-average molecular weight of the block B being approximately between 2,000 and 200,000, and the polydispersity index of the diblock copolymer being approximately between 1.2 and 2.2. It is then characterised in that:

(1) in a first stage, the anionic polymerisation of a monomer A is conducted with the aid of an initiating system comprising at least one initiator of formula R-M(I) in which M denotes a metal chosen from alkali and alkaline-earth metals and R denotes a straight- or branched-chain alkyl radical containing from 2 to 6 carbon atoms or an aryl radical or an arylalkyl radical and at least one alkali metal alcoholate of formula $R_1OM_1$ in which $R_1$ denotes a straight- or branched-chain alkyl radical containing from 1 to 6 carbon atoms or an aryl radical or an arylalkyl radical, and $M_1$ denotes an alkali metal, with the condition that, when $M_1$ is lithium, then R denotes an aryl or arylalkyl radical, so as to obtain a living chain unit of the polymer block A, and then (2) in a second stage the living chain unit thus obtained is reacted with a monomer B in the presence of the initiating system of the first stage.

The proportion of alkali metal alcoholate employed in the process according to the invention depends on the initiator which is chosen, but also on the monomer(s) to be polymerised. Thus, in the case of the polymerisation of a monomer such as methyl methacrylate or a primary alkyl acrylate, a molar proportion of alcoholate of approximately between 0.3 and 15 to the initiator is generally satisfactory. In the case of the preparation of diblock copolymers as described above, an alcoholate/initiator molar ratio of approximately between 2 and 25 is preferably chosen, although larger quantities of alcoholate cannot be detrimental.

The polymerisation or copolymerisation in the process according to the invention is preferably carried out in the absence of moisture and oxygen and in the presence of at least one solvent chosen preferably from aromatic solvents such as benzene and toluene, or else tetrahydrofuran, diglyme, tetraglyme, ortho-terphenyl, biphenyl, decalin or, again, tetralin.

The polymerisation temperature may vary approximately between $-80°$ C. and $+60°$ C., especially in the case of methyl methacrylate, and preferably approximately between $-80°$ C. and $+10°$ C. in the case of most of the other monomers and especially in the case of the block polymerisations. Finally, the initiator is generally employed in a molar ratio to the sum of the monomers A and B which does not exceed approximately $10^{-2}$ and is preferably between $3\times10^{-4}$ and $10^{-2}$.

The process according to the invention also makes it possible to prepare polyalkyl methacrylates, as defined above, which have a number-average molecular mass which is generally approximately between 7,000 and 150,000 and with a molecular mass polydispersity index, defined and determined as above, which is generally approximately between 1.05 and 2.0. These polymethacrylates are not crosslinked and generally contain up to 60% of isotactic triads, from 5 to 50% of heterotactic triads and from 25 to 60% of syndiotactic triads.

The following examples are given by way of illustration and do not limit the present invention.

In all these examples the exclusion chromatography was performed by using a Waters GPC 501 apparatus equipped with two linear columns, with tetrahydrofuran as eluent at a flow rate of 1 ml/min. The number-average molecular masses were determined by means of an HP 502 membrane osmometer.

EXAMPLE 1

$0.72\times10^{-3}$ mol of sodium tert-butylate, previously purified by freeze-drying in benzene and then stored under inert atmosphere in the absence of light, is introduced under nitrogen atmosphere into a predried round bottom flask. 100 ml of predried toluene are added to it, followed, with stirring, dropwise, by $0.2\times10^{-3}$ mol of 1,4-disodio-1,1,4,4-tetraphenylbutane in 0.2 molar solution in toluene. The mixture is cooled to a temperature of $-78°$ C. by means of a mixture of acetone and solid carbon dioxide and then 10 ml of a solution containing 0.04 mol of n-butyl acrylate in toluene are added, still at $-78°$ C., the said acrylate having been previously stirred for 48 hours over calcium hydride, distilled and then treated with fluorenyllithium until the appearance of a permanent yellow colour, and finally distilled over triethylaluminium immediately before the polymerisation.

Reaction is stopped after 60 minutes by adding 5 ml of methanol, after which the solvent is stripped off. n-Butyl polyacrylate is obtained in an 89% yield. Analysis of the polymer by exclusion chromatography shows the following characteristics:

$M_n$ (number-average molecular mass): 32,000

$M_w/M_n$ (polydispersity index): 2.6

EXAMPLE 2

The experiment of Example 1 is reproduced, 1,4-disodio-1,1,4,4-tetraphenylbutane being replaced with $0.2\times10^{-3}$ mol of diphenylmethylpotassium and using $10^{-2}$ mol of sodium tert-butylate. After 60 minutes' reaction, poly-n-butyl acrylate is obtained in a 91% yield. Analysis of the polymer by exclusion chromatography shows the following characteristics:

$M_n$=44,000 $M_w/M_n$=2.4

EXAMPLE 3

The experiment of Example 2 is reproduced, using $0.2\times10^{-3}$ mol of diphenylmethylpotassium and $0.7\times10^{-3}$ mol of sodium tert-butylate and adding in succession 0.03 mol of tert-butyl methacrylate and then 0.10 mol of n-butyl acrylate. After 240 minutes' reaction a block copolymer is obtained in a 75% yield. Analysis of the polymer by exclusion chromatography shows the following characteristics:

Poly(t-BuMA) block: $M_n$=24,000 $M_w/M_n$=1.4

Poly(n-BuA) block: $M_n$=24,000 $M_w/M_n$=3.1

EXAMPLE 4

The experimental procedure of Example 1 is reproduced, the conditions and the ingredients being adjusted as follows:

alcoholate: $9.4\times10^{-3}$ mol of sodium tert-butylate initiator: $0.94\times10^{-3}$ mol of diphenylmethylsodium monomer: 4.7 g of methyl methacrylate solvent: 100 ml of toluene polymerisation temperature: +23° C.

polymerisation time: 5 minutes.

Under these conditions a polymethyl methacrylate which has the following characteristics is obtained in 100% yield:

$M_n$=13,500 $M_w/M_n$=1.18

EXAMPLE 5

The experiment of Example 4 is reproduced, sodium tert-butylate being replaced with lithium tert-butylate and diphenylmethylsodium with diphenylmethyllithium. A polymethyl methacrylate which has the following characteristics is obtained in a 94% yield:

$M_n$=11,000 $M_w/M_n$=1.6

EXAMPLE 6

The experimental procedure of Example 1 is reproduced, the conditions and the ingredients being adjusted as follows:

alcoholate: $0.5\times10^{-3}$ mol of sodium tert-butylate initiator: $10^{-3}$ mol of diphenylmethylsodium monomer: 4.7 g of methyl methacrylate solvent: 100 ml of toluene polymerisation temperature: −30° C.

polymerisation time: 10 minutes.

Under these conditions a polymethyl methacrylate which has the following characteristics is obtained in 100% yield:

$M_n$=7,000 $M_w/M_n$=1.39

Its microstructure can be described as follows:

syndiotactic triads: 13.6% heterotactic triads: 35.7% isotactic triads: 50.7%

EXAMPLE 7

The experiment of Example 6 is reproduced, with the exception of the quantity of alcoholate which is raised to $10^{-2}$ mol. A polymethyl methacrylate which has the following characteristics is obtained in 100% yield:

$M_n$=9,500 $M_w/M_n$=1.05

Its microstructure can be described as follows:

syndiotactic triads: 44.6% heterotactic triads: 38.7% isotactic triads: 16.7%

EXAMPLE 8

The experimental procedure of Example 1 is reproduced, the conditions and the ingredients being adjusted as follows:

alcoholate: $2\times10^{-3}$ mol of sodium tert-butylate initiator: $0.2\times10^{-3}$ mol of diphenylmethylsodium monomer: 5 g of methyl methacrylate solvent: 100 ml of tetrahydrofuran polymerisation temperature: −50° C.

polymerisation time: 5 minutes.

Under these conditions a polymethyl methacrylate which has the following characteristics is obtained in 100% yield:

$M_n$=26,500 $M_w/M_n$=1.4

Its microstructure can be described as follows:

syndiotactic triads: 54.3% heterotactic triads: 41.3% isotactic triads: 4.2%

EXAMPLE 9

The experimental procedure of Example 1 is reproduced, the conditions and the ingredients being adjusted as follows:

alcoholate: $2.2\times10^{-3}$ mol of lithium tert-butylate initiator: $0.2\times10^{-3}$ mol of diphenylmethyllithium monomer: 3.8 g of methyl methacrylate solvent: 100 ml of toluene polymerisation temperature: −30° C.

polymerisation time: 10 minutes.

Under these conditions a polymethyl methacrylate which has the following characteristics is obtained in 100% yield:

$M_n$=89,000 $M_w/M_n$=1.35

EXAMPLE 10

The experimental procedure of Example 1 is reproduced, the conditions and the ingredients being adjusted as follows:

alcoholate: $2.5\times10^{-3}$ mol of lithium tert-butylate initiator: $0.25\times10^{-3}$ mol of alpha-methylstyryllithium monomers: 5 g of styrene, then 5 g of methyl methacrylate solvent: mixture of 70 ml of toluene and 30 ml of tetrahydrofuran polymerisation temperature: −40° C.

polymerisation time: 60 minutes for styrene then 30 minutes for methyl methacrylate.

Under these conditions a block copolymer is obtained in a 72% yield, in which the polystyrene block has the following characteristics:

$M_n=26.000$ $M_w/M_n=1.10$ and in which the polymethyl methacrylate block has the following characteristics:

$M_n=30.000$ $M_w/M_n=1.10$

EXAMPLE 11

The experimental procedure of Example 4 is reproduced, except for the polymerisation temperature, which is raised to +45° C. A polymethyl methacrylate which has the following characteristics is obtained in 100% yield:

$M_n=13.500$ $M_w/M_n=2.0$

EXAMPLE 12

The experimental procedure of Example 1 is reproduced, the conditions and ingredients being adjusted as follows:

initiator: $0.86\times10^{-3}$ mol of n-butylsodium
alcoholate: $8.6\times10^{-3}$ mol of sodium tert-butylate
monomer: 5 ml of n-butyl acrylate
solvent: 100 ml of toluene
polymerisation time: 30 minutes
polymerisation temperature: −78° C.

Under these conditions a poly-n-butyl acrylate which has the following characteristics is obtained in a 71% yield:

$M_n=29.000$ $M_w/M_n=2.8$

EXAMPLE 13

The experimental procedure of Example 12 is reproduced, with the following exceptions:

initiator: $0.4\times10^{-3}$ mol of diphenylmethylsodium
alcoholate: $4\times10^{-3}$ of sodium tert-butylate
solvent: mixture of 12 ml of tetrahydrofuran and 28 ml of toluene.

Under these conditions a poly-n-butyl acrylate which has the following characteristics is obtained in an 85% yield:

$M_n=37.500$ $M_w/M_n=2.5$

EXAMPLE 14

The experimental procedure of Example 12 is reproduced, with the following exceptions:

initiator: $1.25\times10^{-3}$ mol of diphenylhexylsodium
alcoholate: $12.5\times10^{-3}$ mol of sodium tert-butylate
solvent: mixture of 5 ml of tetrahydrofuran and 100 ml of toluene Under these conditions a poly-n-butyl acrylate which has the following characteristics is obtained in a 71% yield:

$M_n=82.000$ $M_w/M_n=2.7$

EXAMPLE 15

5 g of styrene are polymerised first at 0° C. for 1 hour in a mixture of 90 ml of toluene and 10 ml of tetrahydrofuran in the presence of a system comprising $10^{-3}$ mol of n-butylsodium and $10^{-2}$ mol of sodium tert-butylate. Analysis of the polymer block obtained at this stage shows the formation of polystyrene which has the following characteristics:

$M_n=20.300$ $M_w/M_n=1.1$

The mixture is then cooled to a temperature of −78° C. before $1.4\times10^{-3}$ mol of diphenylethylene is added to it, followed by 8 g of n-butyl acrylate diluted in 10 ml of toluene. After the polymerisation has been continued for 2 hours at −78° C., a diblock copolymer which has the following characteristics is obtained in a 73% yield:

$M_n=28.5000$ $M_w/M_n=1.3$

EXAMPLE 16

The experimental procedure of Example 1 is reproduced, the conditions and the ingredients being adjusted as follows:

alcoholate: $5\times10^{-3}$ mol of potassium tert-butylate
initiator: $10^{-3}$ mol of diphenylmethylpotassium
monomer: 0.04 mol of n-butyl acrylate
solvent: 50 ml of tetrahydrofuran
polymerisation temperature: −78° C.
polymerisation time: 10 minutes.

Under these conditions a poly-n-butyl acrylate which has the following characteristics is obtained in a 95% yield:

$M_n=4.500$ $M_w/M_n=1.8$

EXAMPLE 17

The experiment of Example 6 is reproduced, with the following exceptions:

initiator: $2\times10^{-3}$ mol of diphenylmethyllithium
alcoholate: $20.8\times10^{-3}$ mol of lithium tert-butylate
monomer: 4 g of methyl methacrylate
solvent: 100 ml of toluene Under these conditions a polymethyl methacrylate which has the following characteristics and microstructure is obtained in 100% yield:

$M_n=7.800$ $M_w/M_n=1.3$
syndiotactic triads: 32.1%
heterotactic triads: 10.2%
isotactic triads: 57.7%

EXAMPLE 18

5 g of styrene are first polymerised at 0° C. for 30 minutes in a mixture of 90 ml of toluene and 10 ml of tetrahydrofuran in the presence of a system comprising $10^{-3}$ mol of n-butylsodium and $10^{-2}$ mol of sodium tert-butylate. Analysis of the polymer block obtained at this stage shows the formation of polystyrene which has the following characteristics:

$M_n=23.500$ $M_w/M_n=1.07$ $1.05\times10^{-3}$ mol of diphenylethylene is then added to the reaction mixture, followed by 5 g of methyl methacrylate. After the polymerisation has been continued at 0° C. for 15 minutes, a diblock copolymer which has the following characteristics is obtained in 100% yield:

$M_n=50.600$ $M_w/M_n=1.18$

EXAMPLES 19 to 30

The alkali metal M tert-butanolate, previously purified by freeze-drying in benzene and then stored under inert atmosphere in the absence of light, is introduced under nitrogen atmosphere into a predried round bottom flask. 100 ml of a solvent or mixture of solvents (200 ml in the case of Examples 25 and 26) containing x% of tetrahydrofuran and (100-x)% of toluene, the solvent(s) being predried, are added to it, followed, dropwise with stirring, by the initiator in 0.2 molar solution in tetrahydrofuran. The molar quantities of tert-butanolate and of initiator, and the nature of the alkali metal $M_1$ and of the initiator and the value x are shown in Table I below. The mixture is brought to the temperature T (expressed in degrees Celsius) and methyl methacrylate, previously stirred for 48 hours over calcium hydride, distilled and then treated with triethylaluminium immediately before the polymerisation, is then added at this temperature.

After 30 minutes' reaction the solution is sampled in order to analyse the first polymer block obtained by exclusion chromatography. 2-Ethylhexyl acrylate, previously stirred for 48 hours over calcium hydride, distilled and then treated with fluorenyllithium until the appearance of a yellow colour and finally distilled over triethylaluminium immediately before the polymerisation, is then added to the reactor. The 2-ethylhexyl acrylate is then polymerised for one hour, still at the temperature T. The reaction is stopped by adding 2 ml of acidified methanol, after which the product is precipitated in an excess of methanol. After drying in & vacuum at 80° C. the diblock copolymer is obtained in the yield Y (expressed as a percentage) shown in Table I. The value of T and the molar quantities of methyl methacrylate (MMA) and 2-ethylhexyl acrylate (EHA) are also shown in Table 1, together with the number-average molecular mass ($M_n$) expressed in thousands and the polydispersity ($M_w/M_n$) of the block obtained at the end of the first stage and of the overall diblock polymer. Table I therefore illustrates the variety of the diblock polymers which can be obtained by varying reaction parameters such as $M_1$, X, T and the molar quantities of the various ingredients.

TABLE I

| Example | tert-Butanolate | | Initiator | | | | |
|---|---|---|---|---|---|---|---|
| | $M_1$ | mol | nature | mol | X | T | |
| 19 | Na | $3 \times 10^{-3}$ | $\phi_2$CHNa | $5 \times 10^{-4}$ | 0 | −78 | |
| 20 | Na | $3 \times 10^{-3}$ | $\phi_2$CHNa | $5 \times 10^{-4}$ | 100 | −78 | |
| 21 | K | $3 \times 10^{-3}$ | $\phi_2$CHK | $5 \times 10^{-4}$ | 0 | −78 | |
| 22 | K | $3 \times 10^{-3}$ | $\phi_2$CHK | $5 \times 10^{-4}$ | 0 | −30 | |
| 23 | Li | $3.2 \times 10^{-3}$ | DPHLi | $5 \times 10^{-4}$ | 0 | −78 | |
| 24 | Li | $3.2 \times 10^{-3}$ | DPHLi | $5 \times 10^{-4}$ | 0 | −30 | |
| 25 | Li | $3.5 \times 10^{-3}$ | DPHLi | $3.5 \times 10^{-4}$ | 0 | −78 | |
| 26 | Li | $8 \times 10^{-3}$ | DPHLi | $5 \times 10^{-4}$ | 0 | −78 | |
| 27 | Li | $8 \times 10^{-3}$ | SPHLi | $5 \times 10^{-4}$ | 50 | −78 | |
| 28 | Li | $3.2 \times 10^{-3}$ | DPHLi | $5 \times 10^{-4}$ | 100 | −78 | |
| 29 | Li | $3.2 \times 10^{-3}$ | DPHLi | $5 \times 10^{-4}$ | 100 | −30 | |
| 30 | Li | $6.4 \times 10^{-3}$ | DPHLi | $2.5 \times 10^{-4}$ | 100 | −78 | |

| Example | MMA (mol) | EHA (mol) | Y | 1st block | | diblock | |
|---|---|---|---|---|---|---|---|
| | | | | $M_n$ | $M_w/M_n$ | $M_n$ | $M_w/M_n$ |
| 19 | $4.5 \times 10^{-2}$ | $2.4 \times 10^{-2}$ | 100 | nd | nd | 36 | 2.0 |
| 20 | $4.5 \times 10^{-2}$ | $2.4 \times 10^{-2}$ | 60 | 8.5 | 1.2 | 12 | 1.3 |
| 21 | $4.5 \times 10^{-2}$ | $2.4 \times 10^{-2}$ | 100 | 20 | 1.4 | 32 | 2.1 |
| 22 | $4.5 \times 10^{-2}$ | $2.4 \times 10^{-2}$ | 89 | 16 | 1.7 | 21 | 2.1 |
| 23 | $4.5 \times 10^{-2}$ | $2.4 \times 10^{-2}$ | 98 | 19 | 1.2 | 29 | 1.5 |
| 24 | $4.5 \times 10^{-2}$ | $2.5 \times 10^{-2}$ | 81 | 15 | 1.3 | 19 | 1.4 |
| 25 | $4.5 \times 10^{-2}$ | $7.3 \times 10^{-2}$ | 100 | 26 | 1.2 | 65 | 1.6 |
| 26 | $4.5 \times 10^{-2}$ | $7.3 \times 10^{-2}$ | 98 | 15 | 1.4 | 40 | 1.7 |
| 27 | $4.5 \times 10^{-2}$ | $2.4 \times 10^{-2}$ | 93 | 16 | 1.3 | 28 | 1.3 |
| 28 | $4.5 \times 10^{-2}$ | $2.4 \times 10^{-2}$ | 83 | 13 | 1.1 | 50(*) | 1.15(*) |
| 29 | $4.5 \times 10^{-2}$ | $2.4 \times 10^{-2}$ | 54 | 12 | 1.5 | 16 | 1.5 |
| 30 | $4.5 \times 10^{-2}$ | $2.5 \times 10^{-2}$ | 76 | 30 | 1.2 | 40 | 1.3 |

$\phi_2$CHNa: Diphenylmethylsodium
$\phi_2$CHK: Diphenylmethylpotassium
DPHLi: Diphenylhexyllithium
nd: not determined (*) after fractionation of the product obtained at the end of the second stage, the chromatography of this product revealing a bimodal distribution: the product contains 65% by weight of diblock copolymer and 35% of methyl methacrylate homopolymer.

We claim:

1. A polymethyl methacrylate having a number-average molecular weight between 7000 and 150,000, a polydispersity index between 1.05 and 2.0, having no cross-linking, and comprising up to 60% isotactic triads, 5 to 50% heterotactic triads, and 25 to 60% syndiotactic triads, wherein the polymethyl methacrylate is prepared using an initiating system comprising:

at least one initiator of the formula $(C_6H_5)_2$CHM in which M is lithium, sodium, or potassium; and at least one alkali metal alcoholate of the formula $R_1$OLi in which $R_1$ is a straight- or branched-chain alkyl radical containing from 1 to 6 carbon atoms, an aryl radical, or an arylalkyl radical.

2. A polymethyl methacrylate having a number-average molecular weight between 7000 and 150,000, a polydispersity index between 1.05 and 2.0, having no cross-linking, and comprising up to 60% isotactic triads, 5 to 50% heterotactic triads, and 25 to 60% syndiotactic triads, wherein the polymethyl methacrylate is prepared using an initiating system comprising::

at least one initiator selected from the group consisting of 1,1-diphenyl-3-methylpentyllithium, 1,1-diphenylhexyllithium, and alpha-methylstyryllithium; and at least one alkali metal alcoholate of the formula $R_1$OLi in which $R_1$ is a straight- or branched-chain alkyl radical containing from 1 to 6 carbon atoms, an aryl radical, or an arylalkyl radical.

3. A polymethyl methacrylate having a number-average molecular weight between 7000 and 150,000, a polydispersity index between 1.05 and 2.0, having no cross-linking, and comprising up to 60% isotactic triads, 5 to 50% heterotactic triads, and 25 to 60% syndiotactic triads, wherein the polymethyl methacrylate is prepared using an initiating system comprising:

at least one initiator of the formula R-M (I) in which M is an alkali metal or an alkaline-earth metal, and R is a straight- or branched-chain alkyl radical containing 2 carbon atoms, an aryl radical, or an arylalkyl radical; and at least one alkali metal alcoholate of the formula $R_1OM_1$ in which $R_1$ is a straight- or branched-chain alkyl radical containing 1 to 6 carbon atoms, an aryl radical, or an arylalkyl radical, and $M_1$ is sodium, potassium, rubidium or caesium;

excluding the initiating systems comprising alkyl lithium and $R_1OM_1$ in which $R_1$ is an alkyl radical.

4. The polymethyl methacrylate according to claim 3, wherein R-M (I) is 1,1-diphenyl-3-methylpentyllithium, 1,1-diphenylhexyllithium, alpha-methylstyryllithium, n-butyllithium, 1,4-disodio-1,1,4,4-tetraphenylbutane, n-butylsodium, sec.-butyllithium, diphenylmethylsodium, diphenylmethyllithium, or diphenylmethylpotassium.

5. The polymethyl methacrylate according to claim 3, wherein the initiator is selected from the group consisting of $(C_6H_5)_2$CHNA, $(C_6H_5)_2$CHK, and 1,4-disodio-1,1,4,4-tetraphenylbutane, and is used with at least one alcoholate of the formula $R_1$ONa or $R_1$OK in which $R_1$ is a straight- or branched-chain alkyl radical containing 1 to 6 carbon atoms.

* * * * *

UNITED STATES PATENT AND TRADEMARK OFFICE
CERTIFICATE OF CORRECTION

PATENT NO.    : 5,723,559
DATED         : March 3, 1998
INVENTOR(S)   : VARSHNEY et al.

It is certified that error appears in the above-indentified patent and that said Letters Patent is hereby corrected as shown below:

Claim 2, col. 10, line 23, "comprising::" should read --comprising:--.

Signed and Sealed this

Nineteenth Day of May, 1998

Attest:

BRUCE LEHMAN

Attesting Officer

Commissioner of Patents and Trademarks